UNITED STATES PATENT OFFICE.

WILLIAM L. BROCKWAY, OF NEW YORK, N. Y.

MANUFACTURE OF TAGGERS IRON OR TIN FROM WASTE MATERIAL IN OLD CANS, &c.

SPECIFICATION forming part of Letters Patent No. 452,069, dated May 12, 1891.

Application filed August 30, 1890. Serial No. 363,548. (No specimens.)

*To all whom it may concern:*

Be it known that I, WILLIAM L. BROCKWAY, a citizen of the United States, residing at New York city, in the county and State of New York, have invented a certain new and useful Improvement in the Manufacture of Taggers Iron or Tin from Waste Material in Old Tin Cans, Tin Barrels, &c., of which the following is a specification.

The invention consists in treating old tinned steel or iron, and especially the material of old tin cans and like articles, in a certain manner, whereby the sheet iron or steel, which is ordinarily of very good quality, the tin thereon and the lead in the solder when such solder is used, are separated and saved, and are so treated that each material becomes commercially valuable.

Since my invention does not reside in any particular apparatus, but may be practiced by any apparatus adapted to accomplish the steps hereinafter recited, no apparatus is illustrated.

It has heretofore been proposed to separate the iron or steel, tin, and lead, and to utilize one or more of the materials. According to one method the old material was placed in a suitable receptacle and heated by an electric current to a temperature sufficiently high to melt and remove the tin and lead. This method has been found objectionable by reason of its expensiveness, and because the paper, dirt, grease, &c., on the old material seriously interfere with the proper passage of the current. In other methods certain chemical substances have been employed to dissolve or combine with one or more of the metals. This class of processes is also expensive, because the chemical substances used are expensive and because it requires one or more additional steps to reduce the compound formed to metallic tin, lead, or iron, as the case may be. According to a third process, set forth in my patent, No. 141,109, the cans, &c., were placed in a suitable oven and the temperature raised to a high heat—about 1000°—which was found sufficient to melt and remove the tin and lead. The iron was allowed to cool gradually and was thereby partially annealed, after which the bodies of the cans were straightened and were then in condition to be used. By this process the tin and lead were not saved, the heat in the open oven being such as to oxidize and practically destroy them.

I have found that by heating the waste material in a furnace, the heating-chamber of which is hermetically sealed or from which air is wholly or to a large entent excluded, I can raise the temperature of the furnace as high as above indicated (1000°) or somewhat higher without injuring the steel or iron and without oxidizing the tin to a harmful extent. This heating of the cans or other old tinned metal in a furnace from which the air is practically excluded forms one feature of my invention. After heating, the cans are removed from the furnace and straightened out, and the bottoms and the bodies of the cans put in piles by themselves, and are afterward carefully annealed, and when cold are rolled down to the required thinness. Several plates are cold-rolled at once.

I will now describe the best manner of carrying out my improvements. Into a heating-chamber of a furnace of any suitable construction I place a charge of tin cans or other old tinned iron or steel. If the cans are of the size ordinarily used for fruits, vegetables, &c., the charge may consist of several hundred cans. The furnace is then closed and the iron of the cans or other material brought to a cherry red or approximately to that temperature. Tin melts at about 450°, but will not entirely leave the iron or steel until subjected to a temperature of about 1,000°. At this high temperature there is danger of oxidizing the iron and volatilizing the tin; but the use of a closed furnace, as described in this specification, very largely removes this danger. This step of the process may take from three to seven minutes, the time depending on the size and weight of the cans and other modifying causes. The draft of the furnace should be so regulated by dampers that the air entering the combustion-chamber will be thoroughly consumed or oxidized, so that the heated products of combustion may pass to the heating-chamber practically free from air, and may thus be unable to oxidize the metals therein. The tin and lead will drop to the bottom of the furnace, and may be directed into proper receptacles, after which the tin and lead may be separated and put in proper form for the market. When the material consists of cans, the bodies of the cans are partially straightened out and put into a press, or are run through rolls and thoroughly flattened out, and are then bound up into bundles preferably weighing about seventy-five pounds, since such bundles are of convenient size for handling. Said bundles are put into tightly-closed annealing-pots, the plates preferably being placed on edge and supported above the bottom of the annealing pot or chamber, so that the heat can circulate entirely around the plates, and the pots are placed in the furnace and the plates thoroughly annealed. It is well, though not essential, to prolong this step to ten or more hours. When the plates are thus freed from tin and are annealed, they are placed in a pickle to remove the small amount of scale that is formed on them, after which they are dried. Several of the plates are then piled together and passed between heavy rolls until they are reduced to the desired thinness. The body of an ordinary fruit-can when straightened out is about five by thirteen inches, and in thickness is from about No. 28 to No. 30 Stubs' gage, and when rolled to form a plate of about nine by thirteen inches it will be from No. 34 to No. 38 gage in thickness. By rolling the plates cold and several together, as above described, they can be made as thin as foil. I have found that this cannot be done practically with hot-rolling, since the plates crack during the treatment. When very thin plates are desired, it is sometimes necessary or best to anneal the iron one or more times during the rolling. After the rolling is completed I sometimes anneal the plates, preferably by placing several plates together, then placing on them a weight in the form of a thick iron plate, adding more of the thin plates and another weight until a pile of sufficient size is obtained. The weights serve to hold the thin plates in shape. When the plates are removed from annealing-pot, they will have a uniform dead-black color.

The iron plates produced as above described are trimmed to remove the ragged edges, and are then ready for the market. The trimming may be done before the annealing, if desired. The plates produced form a fine grade of taggers iron or steel (or when tinned of taggers tin) superior in quality and finish to plates made from original ore. The cold-rolling process gives the surface a hard smooth finish admirably adapted to receive a polish, a copper, nickel, or other plating, enameling, a coating of tin, &c.

I propose to employ the bottoms of ordinary tinned iron or steel cans when freed from tin and annealed, but without rolling down, for making blacking-boxes and other articles of marketable value, since the bottoms are about the right size and can be stamped up very readily. After being stamped they may be tinned or otherwise coated.

The bodies of the cans when treated as I have above set forth may be used for making buttons, ferrotype-plates, lye-cans, copper-plated, brass-plated, tinned, nickeled, or other foil or plates, or for any other purpose to which a tough high-grade iron plate or tin-foil is adapted. When used for ferrotype-plates and certain other articles, I find it desirable, after treating the plates as above described, to pass them separately between heavy rollers for still further compressing, polishing, and finishing the surface. After the tin is removed by my process the iron may be used without going through the subsequent steps for binding trunks, &c.

Having thus described my invention, what I claim is—

1. The improvement in the art of separating the materials in waste tinned iron or steel, which consists in heating such waste material to a temperature sufficient to melt and remove the tin or tin and lead from the iron, and excluding air from the material during the heating, whereby oxidation is prevented, and collecting the tin, substantially as described.

2. The improvement in the art of manufacturing taggers iron from waste tinned iron or steel, which consists in heating such waste material to a temperature sufficient to melt and remove the tin or tin and lead from the iron, and excluding air from the material during the heating, whereby oxidation is prevented and the tin or tin and lead saved, annealing the iron, and rolling the plates, substantially as described.

3. The improvement in the art of manufacturing taggers iron from waste tinned iron or steel, which consists in heating such waste material to a temperature sufficient to melt and remove the tin or tin and lead from the iron, and excluding air from the material during the heating, whereby oxidation is prevented and the tin or tin and lead saved, annealing the iron, and cold-rolling the plates, substantially as described.

4. The improvement in the art of manufacturing taggers iron from waste tinned iron or steel, which consists in removing the tin, annealing the iron, and simultaneously cold-rolling several sheets of said iron, substantially as described.

5. The improvement in the art of manufacturing taggers iron from waste tinned iron or steel, which consists in removing the tin from the iron, annealing the iron, and cold-rolling the same, substantially as described.

6. The improvement in the art of producing thin iron or steel plates, which consists in annealing the plates, placing several of such plates together, and rolling them cold until the desired thinness is obtained, substantially as described.

7. The improvement in the art of making thin iron plates, which consists in removing the tin from tinned iron or steel cans or similar articles, annealing the body of said cans, cold-rolling the same in bundles, and then
5 separately rolling each individual plate, whereby the surface is smoothed and polished, substantially as described.

This specification signed and witnessed this 29th day of August, 1890.

W. L. BROCKWAY.

Witnesses:
W. PELZER,
E. CONRAN.